United States Patent [19]

Lee et al.

[11] Patent Number: 5,620,813
[45] Date of Patent: Apr. 15, 1997

[54] POSITIVE NICKEL ELECTRODE FOR ALKALINE STORAGE BATTERY

[75] Inventors: Sang-won Lee; Hwang-chul Bae; Geun-bae Kim; Jong-seo Choi; Kwi-seuk Choi; Kyu-nam Joo, all of Suwon, Rep. of Korea

[73] Assignee: Samsung Display Devices Co., Ltd., Kyungki-do, Rep. of Korea

[21] Appl. No.: 651,540

[22] Filed: May 22, 1996

[30] Foreign Application Priority Data

Dec. 15, 1995 [KR] Rep. of Korea .................. 95-50664

[51] Int. Cl.$^6$ ................................................. H01M 4/32
[52] U.S. Cl. ........................................ 429/223; 429/209
[58] Field of Search ............................. 429/223, 209

[56] References Cited

U.S. PATENT DOCUMENTS 5,466,546 11/1995 Pensabene et al. ................... 429/223
5,478,594 12/1995 Frye et al. ......................... 429/223 X

*Primary Examiner*—John S. Maples
*Attorney, Agent, or Firm*—Leydig, Voit & Mayer

[57] ABSTRACT

A positive electrode and a negative electrode for an alkaline storage battery and manufacturing methods thereof are provided. The positive electrode includes a nickel porous body formed on a plate, active material particles containing nickel hydroxide and additives filled up into the nickel porous body, a conductive layer coated on the surface of active material particle, and a protective layer coated on the surface of the conductive layer, for increasing the binding force between the active material particles and preventing the contact between the active material particles and an electrolytic aqueous solution.

6 Claims, 2 Drawing Sheets

POSITIVE NICKEL ELECTRODE FOR ALKALINE STORAGE BATTERY

BACKGROUND OF THE INVENTION

The present invention relates to electrodes for a storage battery, and more particularly, to a positive nickel electrode and a negative electrode for an alkaline storage battery and manufacturing methods thereof, for use in a secondary battery such as an Ni-Cd, Ni-Fe, Ni-Zn, Ni-H or Ni-MH battery, which increase the capacity of the battery and reduce the self-discharge of the battery when open-circuited.

A positive nickel electrode for an alkaline storage battery is made by filling up, so as to permeate, a porous nickel current collector with an active material, i.e., nickel hydroxide, by a sintering or paste method.

In the fabrication of the positive electrode according to the sintering method, first, a porous nickel current collector is made by coating a nickel-plated steel plate with a slurry containing nickel powder as a main component, and drying and sintering the slurry-coated plate. Then, an active material containing nickel hydroxide is precipitated, chemically or electrochemically, at the pores of the nickel current collector, and treated in an alkaline solution. In this method, since the nickel current collector and the active material are strongly bonded and contact each other electrically over a large area, this type of positive nickel electrode exhibits the advantages of a high charging and discharging efficiency and a long life. Also, when additives to the active material are required, the amount of additives can be easily controlled by adding sodium nitrate containing a different element to a nickel nitrate solution and submerging the electrode in the solution.

The sintering method, however, is complicated to perform and costly. The maximum porosity of the current collector is no more than 80% and thus the density of the precipitated active material is relatively low.

On the other hand, a paste type positive nickel electrode is made by spraying or coating a porous nickel current collector of a strong alkali-proof foam metal with an active material in the form of paste and drying the current collector.

Such a paste type positive nickel electrode is advantageous over the sintering type positive nickel electrode in terms of process simplicity and thus fitness for mass production. However, since the porous nickel current collector is directly filled with the active material in the form of paste, the active material contacts the current collector over a smaller area than in the sintering type positive nickel electrode, thus lowering the performance of the battery.

FIG. 1 schematically illustrates a conventional alkaline battery and its positive electrode structure.

Referring to FIG. 1, a nickel porous body 11 formed on a positive electrode plate 10 is filled with particles 12 of an active material containing nickel hydroxide and additives. The active material particles 12 each are coated with a conductive layer 13 of, for example, $Co(OH)_2$. Reactions take place at the positive nickel electrode during charge and discharge, as follows:

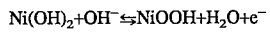

$$Ni(OH)_2 + OH^- \rightleftharpoons NiOOH + H_2O + e^-$$

The crystal structure of the nickel hydroxide, which depends on the manufacturing method thereof, experiences complicated changes during the reactions. Nickel hydroxide produced chemically in an aqueous solution is hexagonal $\beta$-$Ni(OH)_2$, having a nickel ion interpositioned in an octahedral coordination between hydroxide ion layers.

$\beta$-$Ni(OH)_2$ and $\beta$-NiOOH, formed after charging, each have a c-axis length of about 4.6–4.8 Å, since other interstitial ions or $H_2O$ are not introduced between the layers in the crystal structure. The charge and discharge reaction between $\beta$-$Ni(OH)_2$ and $\beta$-NiOOH results in little change in structure and volume, since hydrogen ions are merely adsorbed and dissociated between layers.

On the other hand, when $\beta$-$Ni(OH)_2$ is overcharged, $H_2O$ or interstitial ions are introduced between layers in $\beta$-NiOOH, thereby producing $\gamma$-NiOOH, which is changed into $\alpha$-$Ni(OH)_2$ during discharging, in turn. Undesirable formation of this low-density $\gamma$-NiOOH is accelerated when nickel hydroxide is filled in a high density to increase electron density, which obstructs diffusion of hydrogen ions into crystals.

These $\gamma$-NiOOH and $\beta$-$Ni(OH)_2$ have a c-axis length of about 7–8 Å, a 1.5 time-increase from that of $\alpha$-$Ni(OH)_2$ or $\beta$-NiOOH, since $H_2O$ and interstitial ions between layers. Here, when charging, $\alpha$-$Ni(OH)_2$ is changed into $\beta$-$Ni(OH)_2$ of high density through chemical reaction, entailing a remarkable change in volume. This volume change causes swelling of the electrode and thus fall-off of the active material. As a result, a battery is charged in two stages.

It is known that the major causes of degradation of a positive nickel electrode is the swelling-induced fall-off of the active material, destruction of the current collector, and corrosion of nickel used for the current collector.

In an attempt to overcome the above problems, a method has been reported in which space for proton transfer is secured by transforming the lattice structure of nickel hydroxide. Thereby the conductivity of an active material is increased, leading to active transfer of electrons and suppression of $\gamma$-NiOOH formation. For example, to induce transformation of the lattice, Zn or Mg is dissolved in a solid state in nickel hydroxide. To increase the conductivity, a conductive material such as a Co class compound is added. Co or preferably CoO is generally used as the conductive material. However, since the amount of the added compound reaches 10–20% of the total amount, the amount of nickel hydroxide used as the active material is relatively reduced, thus decreasing the capacity of the battery. Furthermore, it is difficult to completely prevent the electrode degradation and $\gamma$-NiOOH formation caused during repeated charge and discharge processes.

In addition, in the charge and discharge reactions of the conventional battery, the change in oxidation number is only one through the reaction of $\beta$-$Ni(OH)_2 \rightleftharpoons \beta$-NiOOH. One electron per nickel atom is exchanged during charge and discharge. Thus, the theoretical capacity is merely 289 mAhr/g.

FIG. 2 schematically illustrates a conventional alkaline battery and its negative electrode structure. A negative electrode plate 20 for a cathode includes an active material structure 25 formed thereon and a hydrogen storage metal 26 filling the active material structure 25.

The hydrogen storage metal 26 itself is a metal, thus having no problem related to conductivity. However, its hydrogen storage capacity sensitivity varies with temperature, and thus the self-discharge of the battery easily occurs at high temperatures. Moreover, the conventional negative electrode using $Cd(OH)_2$ as the active material has the problem of large self-discharge.

SUMMARY OF THE INVENTION

It is an object of the present invention to provide electrodes for an alkaline storage battery and manufacturing methods thereof, which includes a non-aqueous, protective layer for preventing contact between an active material and an electrolytic aqueous solution, to prevent fall-off of the active material and reduce the self-discharge of the battery.

To achieve the above object, there is provided a positive electrode for an alkaline battery comprising: a plate; a nickel porous body formed on the plate; active material particles containing nickel hydroxide and additives, filled up, so as to permeate, into the nickel porous body; a conductive layer coated on the surface of the active material particle; and a non-aqueous, protective layer coated on the surface of the conductive layer, for increasing the binding force between the active material particles and preventing contact between the active material particles and an electrolytic aqueous solution.

There is provided a negative electrode for an alkaline battery comprising: a plate; an active material structure formed on the plate; hydrogen storage metal particles filled up, so as to permeate, into the active material structure; and a non-aqueous, protective layer coated on the surfaces of the hydrogen storage metal particles, for preventing contact between the hydrogen storage metal particles and an electrolytic aqueous solution.

There is provided a method for manufacturing a positive electrode for an alkaline battery, comprising the steps of: permeating a porous nickel body formed on a plate with active material particles containing nickel hydroxide and additives; submerging the plate in an aqueous electrolytic solution to form a conductive layer on the surfaces of the active material particles; and forming a protective layer on the surface of the active material particles by submerging the plate for a predetermined time in a solution which is less conductive than the active material, and neither reacts nor mixes with an aqueous electrolytic solution, and drying the plate.

There is provided a method for manufacturing a cathode, comprising the steps of: permeating an active material structure formed on a plate with hydrogen storage metal particles; and forming a protective layer on the surface of the hydrogen storage metal particle, by submerging the plate for a predetermined time in a liquid or solution which is less conductive than the active material and does not react with an electrolytic aqueous solution, and thereafter drying the plate.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 3:
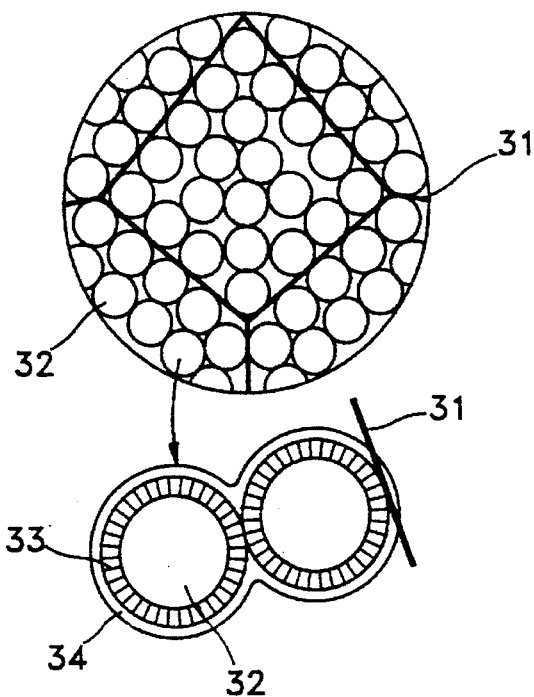
FIG. 3 illustrates an alkaline battery and a partially magnified positive electrode thereof according to the present invention.

Referring to FIG. 3, a positive electrode for an alkaline storage battery according to the present invention includes a porous nickel body 31 formed on a plate, and active material particles 32 containing nickel hydroxide and additives, such as conductive materials, for example, Co and CoO, Zn, and additives, such as bonding agents filling or permeating the pores of the porous body 31. Each of the active material particles 32 has a conductive layer 33 coating its surface. The conductive layer 33 is generally formed of $Co(OH)_2$ or $CoO(OH)$, resulting from the reaction of Co or CoO in aqueous alkaline solution, such as KOH or NaOH solution. The surface of the conductive layer 33 is coated with a non-aqueous protective layer 34. The liquid protective substance or solution layer 34, which is characteristic of the present invention, serves to prevent fall-off of the active material 32 and reduce the self-discharge of the battery by preventing electrical contact between the active material 32 and an aqueous electrolytic solution. Preferably, the protective layer 34 is less conductive than $Ni(OH)_2$ used as the active material. It is preferably a liquid formed from one or more organic compounds which are immiscible or substantially immiscible with water and do not react or mix with the aqueous electrolytic solution. The protective layer 34 may be formed of at least one substance selected from the group including benzene, n-butylacetate, sec-butylacetate, n-butylchloride, carbon tetrachloride, chlorobenzene, chloroform, cyclohexane, cyclopentane, dichlorobenzene, ethyl ether, heptane, hexane, methylenechloride, toluene, trichloroethylene, and xylene.

Figure 4:
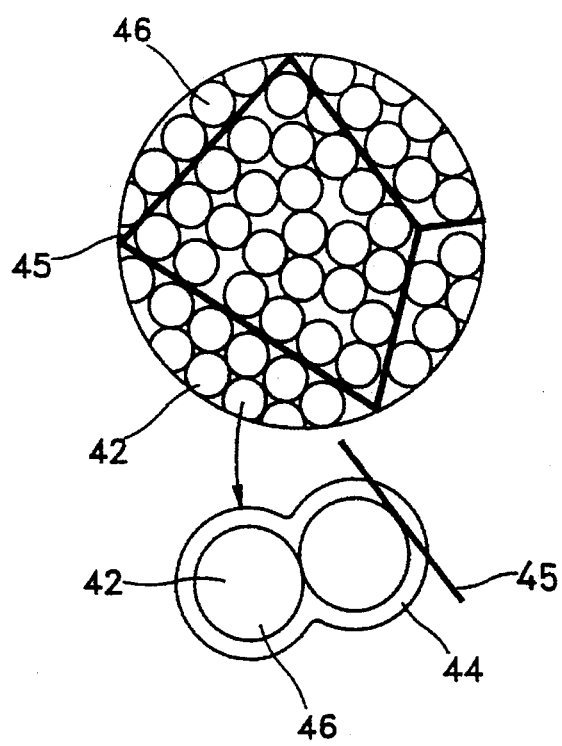
FIG. 4 illustrates the alkaline battery and a partially magnified negative electrode thereof according to the present invention.

Referring to FIG. 4, a negative electrode for an alkaline storage battery according to the present invention includes an active material structure 45, such as $Cd(OH)_2$, and hydrogen storage metal particles 46 permeating the pores of the active material structure 45. The surfaces of the hydrogen storage metal particles 46, which may be any substance commonly used by the skilled artisan for such purposes (for example, $Mg_2Ni$, $Mg_2Cu$, $CaNi_5$, $ZrMn_2$, etc.), are coated with a protective layer 44, like the active material particles of the positive electrode.

A method for manufacturing a positive electrode for an alkaline storage battery will be described.

Figure 1:
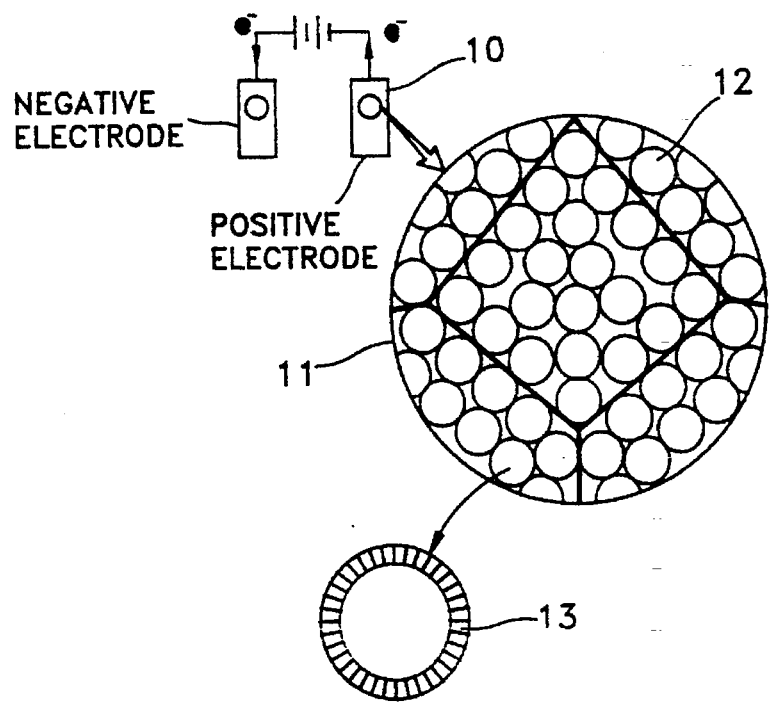
FIG. 1 illustrates a conventional alkaline battery and a partially magnified positive electrode thereof.
Figure 2:
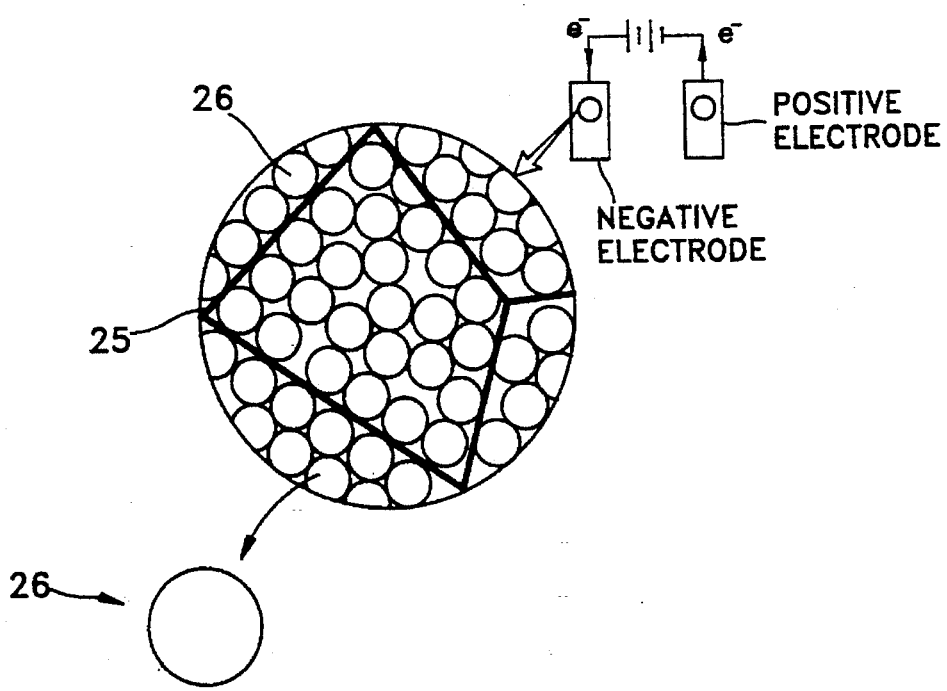
FIG. 2 illustrates the conventional alkaline battery and a partially magnified negative electrode thereof.

The porous nickel body 31 formed on the plate (reference numeral 10 in FIG. 1) is filled with the active material particles 32, and then dried at an above-ambient temperature for a time sufficient to remove substantially all moisture and cause drying. After the active material particles 32 are completely dried, the plate is submerged into a KOH solution for a time sufficient to allow total permeation and reaction, e.g., on the order of about 12 hours. At this time, an additive, CoO, contained in the active material is changed into $CoO(OH)$ or $Co(OH)_2$. Then, the plate is dried again at an above-ambient temperature for a time sufficient to remove substantially all moisture and effect drying, thus forming conductive layers 33 on the active material particles 32. Subsequently, the plate is submerged for a predetermined time in a non-aqueous liquid protective substance or solution which is less conductive than the active material. The liquid protective substance or solution is preferably a liquid formed from one or more organic compounds which are immiscible or substantially immiscible in water and do not react or mix with an aqueous electrolytic solution, and thereby the conductive layers 33 are coated with protective layers 34. The time required for the plate to be submerged in the protective liquid or solution can be adequately controlled in consideration of the performance of the battery, the kind of solution, and additives added to the solution. Preferably, the solution does not react with the KOH solution. Finally, when the coating of the active material particles 32 is completed, the plate is dried. With the coating of the protective layers 34 on the surfaces of the anode active material particles 32, the active material becomes less conductive with respect to the electrolytic aqueous solution, resulting in a flow of a relatively large amount of current between the active material and the nickel porous body 31.

According to the present invention, the negative electrode manufacturing method is the same as the positive electrode manufacturing method, except for the step of forming the conductive layer. In other words, a negative electrode is made by submerging a fabricated plate in a liquid protective substance or solution which is less conductive than an active material and does not react or mix with the aqueous electrolytic solution, and drying the plate.

The protective layers 34 and 44 coating on the active material particles 32 and 42, respectively, increase the binding force between the active material particles 32 and 42, thereby preventing fall-off of the active materials caused during charge and discharge. Further, since the active materials are prevented from reacting with the aqueous electrolytic solution, the self-discharge of the battery is reduced and electron exchanges at the electrode are facilitated. Thus, the capacity of the battery is increased and its long lifetime is ensured.

EXAMPLE 2 g of water was mixed with 4.36 g of nickel hydroxide including 5 wt % of Zn dissolved in a solid state, 0.62 g of CoO, 0.15 g of Co, 0.03 g of (hydroxypropyl)methyl cellulose (HPMC), and 0.1 g of polytetrafluoroethylene (PTFE). The nickel porous body 31 formed on the plate was filled with the above mixture, submerged in a KOH solution, and completely dried. Then, the plate was submerged in 100% toluene for 30 minutes and dried. The capacity of the battery fabricated from the electrode plate increased by 20% over that of the battery of a non-toluene treated electrode.

What is claimed is:

1. A positive electrode for an alkaline battery comprising:

a plate;

a nickel porous body disposed on said plate;

active material particles containing nickel hydroxide and additives permeating said nickel porous body;

a conductive layer coating said active material particles; and a protective layer coating said conductive layer for increasing binding between said active material particles and preventing contact between said active material particles and an aqueous electrolytic solution wherein said protective layer includes at least one substance selected from the group consisting of benzene, n-butylacetate, sec-butylacetate, cyclohexane, cyclopentane, ethyl ether, heptane, hexane, toluene, and xylene.

2. The positive electrode for an alkaline battery as claimed in claim 1 wherein said protective layer is less conductive than said active material particles.

3. The positive electrode for an alkaline battery as claimed in claim 2 wherein said protective layer neither reacts nor mixes with the aqueous electrolytic solution.

4. A positive electrode for an alkaline battery comprising:

a plate;

a nickel porous body disposed on said plate;

active material particles containing nickel hydroxide and additives permeating said nickel porous body;

a conductive layer coating said active material particles; and a protective layer coating said conductive layer for increasing binding between said active material particles and preventing contact between said active material particles and an aqueous electrolytic solution wherein said protective layer includes at least one substance selected from the group consisting of n-butylchloride, carbon tetrachloride, chlorobenzene, chloroform, dichlorobenzene, methylene chloride, and trichloroethylene.

5. The positive electrode for an alkaline battery as claimed in claim 4 wherein said protective layer is less conductive than said active material particles.

6. The positive electrode for an alkaline battery as claimed in claim 5 wherein said protective layer neither reacts nor mixes with the aqueous electrolytic solution.

\* \* \* \* \*